United States Patent
Liu et al.

(10) Patent No.: US 12,452,018 B2
(45) Date of Patent: Oct. 21, 2025

(54) RESOURCE DETERMINING METHOD AND DEVICE

(71) Applicant: VIVO MOBILE COMMUNICATION CO., LTD., Dongguan (CN)

(72) Inventors: Siqi Liu, Dongguan (CN); Zichao Ji, Dongguan (CN); Xueming Pan, Dongguan (CN); Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 464 days.

(21) Appl. No.: 17/965,731

(22) Filed: Oct. 13, 2022

(65) Prior Publication Data

US 2023/0037061 A1    Feb. 2, 2023

Related U.S. Application Data

(63) Continuation of application No. PCT/CN2021/087728, filed on Apr. 16, 2021.

(30) Foreign Application Priority Data

Apr. 16, 2020 (CN) .......................... 202010302289.8

(51) Int. Cl.
  *H04L 5/00* (2006.01)
  *H04W 72/12* (2023.01)
(52) U.S. Cl.
  CPC .......... *H04L 5/0053* (2013.01); *H04L 5/0092* (2013.01); *H04W 72/12* (2013.01)
(58) Field of Classification Search
  CPC .................................................. H04W 72/21

USPC ......................................................... 370/329
See application file for complete search history.

(56) References Cited

U.S. PATENT DOCUMENTS

| | | | |
|---|---|---|---|
| 2013/0195041 | A1 | 8/2013 | Papasakellariou et al. |
| 2013/0230030 | A1 | 9/2013 | Papasakellariou et al. |
| 2019/0149365 | A1 | 5/2019 | Chatterjee et al. |

FOREIGN PATENT DOCUMENTS

| | | |
|---|---|---|
| AU | 2017412458 A1 | 11/2019 |
| CN | 109121205 A | 1/2019 |
| CN | 109417790 A | 3/2019 |
| CN | 109845370 A | 6/2019 |
| CN | 110034892 A | 7/2019 |
| CN | 110167159 A | 8/2019 |
| CN | 110266461 A | 9/2019 |
| CN | 110475342 A | 11/2019 |
| CN | 110535572 A | 12/2019 |
| CN | 110798866 A | 2/2020 |
| CN | 110831198 A | 2/2020 |
| CN | 113543321 A | 4/2022 |

(Continued)

OTHER PUBLICATIONS

International Search Report issued in corresponding International Application No. PCT/CN2021/087728, mailed Jul. 23, 2021, 6 pages.

(Continued)

*Primary Examiner* — Angel T Brockman
(74) *Attorney, Agent, or Firm* — IPX PLLC

(57) ABSTRACT

A resource determining method and a device are provided. The method includes: obtaining indication information of one or more reference points of a target resource; and determining the target resource according to the indication information.

19 Claims, 8 Drawing Sheets

(56) References Cited

FOREIGN PATENT DOCUMENTS

IN 110474744 A 11/2019

OTHER PUBLICATIONS

Huawei, HiSilicon, Remaining issues on bandwidth part, 3GPP TSG RAN WG1 Meeting #90bis, R1-1717077, Oct. 13, 2017, 11 pages.
First Office Action issued in related Chinese Application No. 202010302289.8, mailed Mar. 17, 2022, 10 pages.
Second Office Action issued in related Chinese Application No. 202010302289.8, mailed Aug. 16, 2022, 7 pages.
Ericsson, Feature lead summary#1 on Resource allocation for NR sidelink Mode 1, 3GPP TSG-RAN WG1 Meeting #98, R1-1909487, Sep. 3, 2019, 28 pages.

| | Oct 1 | Oct 2 | | Oct N |
|---|---|---|---|---|
| | $T_0$ | $T_8$ | | $T_{(N-1)*8}$ |
| | $T_1$ | $T_9$ | | $T_{(N-1)*8+1}$ |
| | $T_2$ | $T_{10}$ | ... | $T_{(N-1)*8+2}$ |
| | $T_3$ | $T_{11}$ | | $T_{(N-1)*8+3}$ |
| | $T_4$ | $T_{12}$ | | $T_{(N-1)*8+4}$ |
| | $T_5$ | $T_{13}$ | | $T_{(N-1)*8+5}$ |
| | $T_6$ | $T_{14}$ | | $T_{(N-1)*8+6}$ |
| | $T_7$ | $T_{15}$ | | $T_{(N-1)*8+7}$ |

FIG. 3

RESOURCE DETERMINING METHOD AND DEVICE

CROSS-REFERENCE TO RELATED APPLICATIONS

This application is a continuation of International Application No. PCT/CN2021/087728, filed on Apr. 16, 2021, which claims priority to Chinese Patent Application No. 202010302289.8, filed on Apr. 16, 2020. The entire contents of each of the above-identified applications are expressly incorporated herein by reference.

TECHNICAL FIELD

The present disclosure relates to the field of communications technologies, and in particular, to a resource determining method and device.

BACKGROUND

In a 5th-Generation (5G) New Radio (NR) system, to improve coverage of a control channel, some cells are generally deployed on carriers on a low band. However, bandwidth of the carrier on the low band is insufficient, and a large number of carriers on the low band are deployed for another system (for example, Long Term Evolution (LTE)). Consequently, downlink signaling overheads of some cells are large, and a system capacity is affected. Therefore, a 5G technology proposes a design in which one piece of Downlink Control Information (DCI) is supported to simultaneously schedule multiple cells, to reduce downlink control signaling overheads.

However, in a case that one DCI schedules multiple Component Carriers (CCs), a corresponding transmission or feedback resource cannot be determined in the existing design. In addition, on a high band, a symbol is shortened as a SubCarrier Spacing (SCS) increases, and the existing design may not ensure sufficient processing time for a user.

SUMMARY

Embodiments of the present disclosure provide a resource determining method and device.

According to a first aspect, an embodiment of the present disclosure provides a resource determining method, including:

obtaining indication information of one or more reference points of a target resource;

and determining the target resource according to the indication information.

According to a second aspect, an embodiment of the present disclosure provides a user side device, including:

an obtaining module, configured to obtain indication information of one or more reference points of a target resource; and a determining module, configured to determine the target resource according to the indication information.

According to a third aspect, an embodiment of the present disclosure further provides a user side device, including a processor, a memory, and a computer program that is stored in the memory and that can run on the processor, and when the computer program is executed by the processor, steps in the foregoing resource determining method are implemented.

According to a fourth aspect, an embodiment of the present disclosure further provides a computer-readable storage medium, where the computer-readable storage medium stores a computer program, and when the computer program is executed by a processor, steps in the foregoing resource determining method are implemented.

According to a fifth aspect, an embodiment of the present disclosure further provides a computer software product, where the computer software product is stored in a non-volatile storage medium, and the software product is configured to be executed by at least one processor to implement steps in the foregoing resource determining method.

BRIEF DESCRIPTION OF DRAWINGS

FIG. 3 is a schematic diagram of a reference point list according to an embodiment of the present disclosure;

DETAILED DESCRIPTION

The following describes the present disclosure in detail with reference to the accompanying drawings and specific embodiments. For ease of description, the following symbol "I" is equivalent to or.

The method in the embodiments of the present disclosure is applied to a user side device, and the user side device (User Equipment (UE)) may be an access terminal, a user unit, a user station, a mobile station, a mobile console, a remote station, a remote terminal, a mobile device, a user terminal, a terminal, a wireless communications device, a user agent, or a user apparatus. The terminal device may, in some embodiments, be a cellular phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, an in-vehicle device, or a wearable device.

Figure 1:
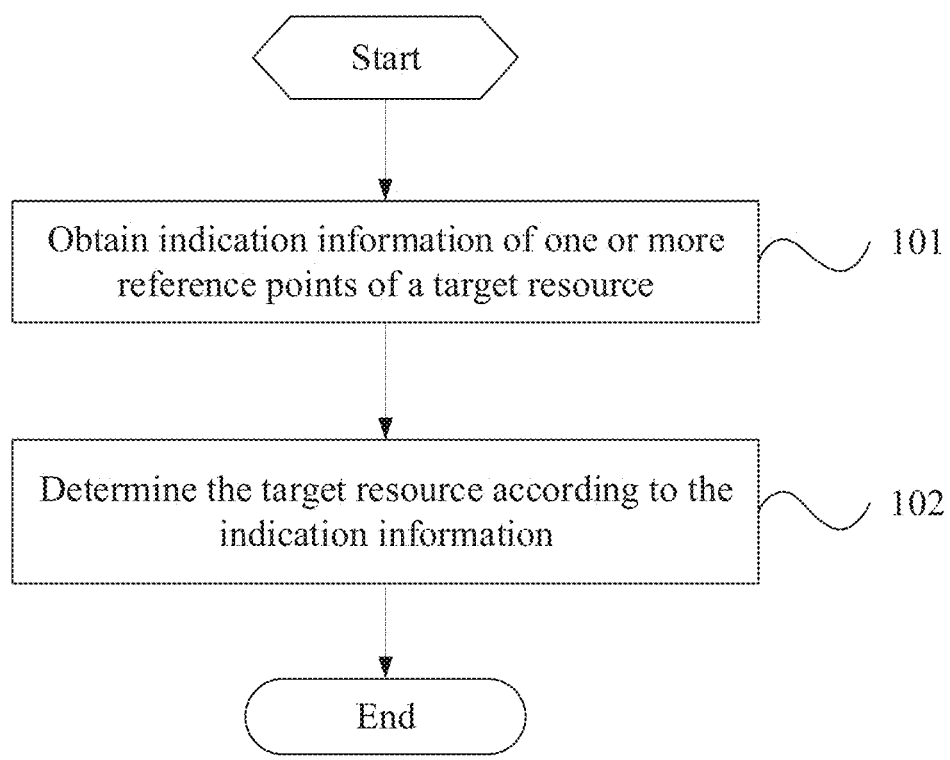
FIG. 1 is a schematic flowchart of a resource determining method according to an embodiment of the present disclosure.

As shown in FIG. 1, a resource determining method in an embodiment of the present disclosure includes:

Step 101: Obtain indication information of one or more reference points of a target resource.

Herein, the reference point is used to determine the target resource, and the target resource may be a data resource and/or a feedback resource. The indication information is used to indicate one or more reference points. In this step, the indication information is obtained, so that the target resource can be determined in a next step.

Step 102: Determine the target resource according to the indication information.

In this step, after the indication information obtained in step 101, the target resource used for transmission can be finally determined by using one or more reference points indicated by the indication information.

Therefore, based on step 101 and step 102, in the resource determining method in this embodiment of the present disclosure, the indication information is obtained first, because the indication information is for the target resource and indicates information about one or more reference points of the target resource, and then the target resource used for transmission can be determined by using the indication information, thereby avoiding a case in which a transmission resource cannot be determined, and ensuring implementation of transmission.

Signaling indicating resource allocation may carry the indication information, or may not carry the indication information.

For example, the method in this embodiment of the present disclosure may be used in data transmission and/or feedback transmission. For data transmission, after obtaining indication information of one or more reference points, a user side device can determine, by using a corresponding reference point indicated by the indication information, a data resource used for data transmission, such as a Physical Downlink Shared CHannel (PDSCH) and/or a Physical Uplink Shared CHannel (PUSCH). For feedback transmission, after obtaining indication information of one or more reference points, the user side device can determine, by using a corresponding reference point indicated by the indication information, a feedback resource used for feedback transmission, such as a PUSCH.

In some embodiments, step 101 includes at least one of the following manners:

through higher layer signaling;
being pre-defined; and
through control signaling.

In this way, if a base station configures the one or more reference points of the target resource through higher layer signaling (for example, Radio Resource Control (RRC)), UE may obtain the indication information by receiving the higher layer signaling. In some embodiments, the base station or the UE obtains the indication information through pre-defining (such as protocol-defined or user-defined). In some embodiments, the UE obtains the indication information by receiving control signaling (such as at least one of RRC, a Medium Access Control Control Element (MAC CE)), or other higher layer signaling and DCI). The DCI may be joint scheduling DCI for scheduling N CCs, that is, joint DCI, or may be single scheduling DCI, that is, single DCI. The method in this embodiment may be applied to a low frequency band, or may be applied to a high frequency band. For example, the method in this embodiment may be used in a Dynamic Spectrum Sharing (DSS) frequency band, an LTE refarming frequency band, an FR1 frequency band, or an unlicensed frequency band, or may be used in an FR2 frequency band, an FR3 frequency band, or a frequency band greater than 52.6 GHz.

Certainly, the indication information required for determining the target resource may be obtained by using a joint indication of at least two of higher layer signaling, pre-defined signaling, and control signaling. For example, a first set of reference points may be obtained through higher layer signaling or pre-defined indication information, and one or more reference points in the first set may be further obtained through control signaling to determine the target resource; or different signaling (for example, higher layer signaling and control signaling, or first control signaling and second control signaling) may be successively received, and the reference point of the target resource may be jointly determined by multiple pieces of signaling, or the reference point of the target resource is successively determined based on signaling time, or the reference point that is used to determine the target resource is obtained based on a priority of indication information.

For example, a manner in which multiple pieces of signaling are used to obtain the reference point used to determine the target resource is: jointly determining, based on content of multiple received signaling indications, the indication information required for the target resource. For example, RRC signaling indicating a reference point period is received first, and then DCI indicating a time domain offset of the reference point is received, so that the reference point required for determining the target resource is obtained. For example, signaling indicating an indication identifier of a time domain resource in which the reference point is located is received first, and then another piece of signaling indicating a reference point identifier is received, so that it is learned that the reference point required for determining the target resource is a reference point that is corresponding to the reference point identifier and that is on a time domain resource corresponding to the time domain resource indication identifier.

For example, a manner of successively obtaining, according to time, the reference points used to determine the target resource is: gradually determining, based on signaling received at different times, indication information required by the target resource. For example, RRC signaling indicating a reference point set is received first, and then DCI indicating a reference point in the reference point set is received, so that the reference point required for determining the target resource is obtained.

For example, a manner of obtaining, based on a priority of the indication information, the reference point used to determine the target resource is: at least some content in a signaling indication with a higher priority covers or replaces corresponding content in a signaling indication with a lower priority. For example, if it is assumed that priority of RRC signaling is lower than that of first control signaling, RRC indicating a reference point or an attribute of the reference point is received, and the first control signaling indicating different reference points or different reference point attributes is received, the user determines, based on the first control signaling, the reference point required for determining the target resource. It is also assumed that the priority of the RRC signaling is lower than that of the first control signaling, and the priority of the first control signaling is lower than that of the second control signaling. If the user receives the RRC signaling but does not receive the first control signaling or the second control signaling, the user determines, based on the RRC signaling, the reference point required for determining the target resource. If the user receives the RRC signaling and the first control signaling but does not receive the second control signaling, the user determines, based on the first control signaling, the reference point required for determining the target resource. If the user receives the RRC signaling, the first control signaling, and the second control signaling, the user determines, based on the second control signaling, the reference point required by the target resource.

For example, in this embodiment, the indication information includes at least one of the following:

a position of a first channel;

a type of the reference point;
a time offset of the reference point relative to a first position;
a period;
an indication identifier of a frequency domain resource in which the reference point is located;
an indication identifier of a time domain resource in which the reference point is located;
a reference point identifier;
cell information;
BandWidth Part (BWP) information; and
Hybrid Automatic Repeat reQuest (HARQ) process information of the reference point.

The first channel may be a Physical Uplink Control CHannel (PUCCH), a PUSCH, or a PDSCH. For example, if the target resource is a PDSCH, the first channel may be a PUCCH. The reference point type may be a periodic reference point and/or an aperiodic reference point. Reference points corresponding to different periods may be the same or different. The HARQ process information of the reference point includes at least one of a HARQ process number corresponding to the reference point, a HARQ process reference point (such as an offset value or a minimum HARQ process number) corresponding to the reference point, or a quantity of HARQ processes corresponding to the reference point, but is not limited to the content. Certainly, the indication information includes a position of the first channel, which may indicate that the position of the reference point is the position of the first channel, or may indicate that the position of the reference point is determined based on the position of the first channel.

In some embodiments, if the indication information includes a period P and/or a time offset O relative to the first position, a reference point indicated by the indication information is the first position+K*P+O, where K is an integer greater than or equal to 0. For example, if P=20 slots, O=4 slots, and the first position is slot0, slot4, slot24, slot44, . . . , slot K*20+4 are all reference points. In some embodiments, the reference point indicated by the indication information is a time domain resource that meets a preset condition, and the preset condition is set based on P and/or O, for example, (SFN*10*U+slot index) mod P=O, where U=S/15 kHz. If a slot index Y of a slot meets (SFN*10*U+Y) mod P=O, the slot is a reference point. S is an uplink or downlink SCS.

In some embodiments, in the indication information, the first channel includes at least one of the following:
a channel on a cell corresponding to a first preset cell identity in scheduled cells;
a channel on a BWP corresponding to a first preset BWP identifier in scheduled BWPs;
a channel on a BWP corresponding to a first preset SCS in the scheduled BWPs; and
a channel on which a resource corresponding to a second preset SCS in scheduled resources is located.

The first preset cell identity may be a highest cell identity or a lowest cell identity, or certainly may be another cell identity. The first preset BWP identifier may be a highest BWP identifier or a lowest BWP identifier, or certainly may be another BWP identifier.

In some embodiments, in the indication information, the first position includes at least one of the following:
a position of a time domain resource in which the indication information is located;
a position of a time domain resource in which downlink control information is located;
a position of a target slot of a preset System Frame Number (SFN);
a boundary of a target window;
a start position of a period of search space in which the downlink control information is located;
an end position of the period of the search space in which the downlink control information is located;
a time domain position of a reference object; and
a time domain position of a quasi-co-location reference.

The preset SFN may be an SFN0. The target window may be a window closest to a position of a data channel or a position of downlink control information, where the window may be a boundary of a radio frame, that is, a nearest frame. The reference object may be a Synchronization Signal and Physical Broadcast CHannel (PBCH) Block (SSB) and/or a Reference Signal (RS). The RS includes at least one of a Channel State Information Reference Signal (CSI-RS), a Sounding Reference Signal (SRS), a Phase-Tracking Reference Signal (PT-RS), a Tracking Reference Signal (T-RS), or a Positioning Reference Signal (PRS). For example, if an SSB index is configured, a time domain position of an SSB corresponding to the index is the first position.

The Quasi Co-Location (QCL) reference includes an RS indicated in a Transmission Configuration Indication (TCI) state transmitted in downlink and/or a QCL reference transmitted in uplink. For example, if an RS of a TCI state corresponding to a PDCCH is an SSB, a time domain position of the SSB is the first position; if an RS of a TCI state corresponding to a PDCCH is a CSI-RS, a time domain position of the CSI-RS is the first position; if an RS in a TCI state corresponding to data is an SSB, a time domain position of the SSB is the first position; and if an RS in a TCI state corresponding to data is a CSI-RS, a time domain position of the CSI-RS is the first position.

It should be noted that in this embodiment, the downlink control information may be a part of the indication information, for example, may be first or second control signaling. The downlink control information may not the indication information.

In some embodiments, in the indication information, the cell information includes a cell identity and/or a cell bitmap.

Herein, the cell identity directly represents a cell corresponding to the reference point, and the cell bitmap indicates, by using at least some bits of the cell bitmap, the cell corresponding to the reference point.

In some embodiments, in the indication information, the cell information includes information about at least one cell or cell group corresponding to the reference point.

In some embodiments, in the indication information, the BWP information includes a BWP identifier and/or a BWP bitmap.

Herein, the BWP identifier directly represents a BWP corresponding to the reference point, and the BWP bitmap indicates, by using at least some bits of the BWP bitmap, the BWP corresponding to the reference point.

In some embodiments, in the indication information, the bandwidth part BWP information includes information about at least one BWP or BWP group corresponding to the reference point.

In addition, in a case that a set of reference points may be determined by using at least one of higher layer signaling, pre-defined signaling, or control signaling, for example, in this embodiment, the indication information includes:
a reference point bitmap and/or a reference point number; where at least some bits in the reference point bitmap correspond to at least some reference points in a first reference point set; and/or the reference point number is a number of a reference point in the first reference point set, or the reference point number is a number of a reference point in a preset quantity of reference points; and the first reference point set is a set of reference points determined by using at least one of higher layer signaling, pre-defined signaling, and control signaling.

The number of the reference point in the first reference point set indicates a position or a sequence of the reference point in the first reference point set. In some embodiments, the reference point number is a number, such as a position or a sequence, of the reference point in a preset quantity of reference points. In some embodiments, the preset quantity may be a maximum quantity of reference points indicated by the indication information. The maximum quantity of reference points may be indicated by the indication information, may be indicated or configured by other information, or may be specified in a protocol.

Certainly, the indication information may further include at least one of a period of the reference point, a time offset of the reference point relative to the first position, an indication identifier of a time domain resource in which the reference point is located, or a reference point identifier.

For example, C reference points may be obtained by using first indication information configured through higher layer signaling and/or pre-defined. The first indication information may include at least one of a time offset of the reference point relative to the first position, a period of the reference point, an indication identifier of a time domain resource in which the reference point is located, or a reference point identifier. D reference points may be obtained by using second indication information of the first control signaling. The second indication information may include at least one of a time offset of the reference point relative to the first position, a period of the reference point, an indication identifier of a time domain resource in which the reference point is located, a reference point identifier, a reference point bitmap, or a reference point number. If the second indication information includes a reference point bitmap corresponding to the C reference points, the D reference points obtained by using the reference point bitmap belong to the C reference points. If the second indication information includes reference point numbers of the C reference points, the D reference points obtained by using the reference point numbers belong to the C reference points. Certainly, the time offset of the reference point relative to the first position in the second indication information may be at least one time offset of the reference point relative to the first position in the first indication information, or the reference point period in the second indication information may be at least one time offset of the reference point relative to the first position in the first indication information, or the indication identifier of the time domain resource in which the reference point is located in the second indication information may be at least one time offset of the time domain resource in which the reference point is located in the first indication information, or the reference point identifier in the second indication information may be at least one time offset of the reference point identifier in the first indication information, to further obtain the D reference points in the C reference points. If C is a multiple of 8, for example, C corresponding to the first indication information is 64, D corresponding to the second indication information is 8 or 1.

In some embodiments, after the second indication information, E reference points may be obtained by using third indication information of the second control signaling. The third indication information may include at least one of a time offset of the reference point relative to the first position, a period of the reference point, an indication identifier of a time domain resource in which the reference point is located, a reference point identifier, a reference point bitmap, or a reference point number. In this case, the third indication information may be a further indication based on the C reference points, or may be a further indication based on the D reference points. If the third indication information may be a further indication based on the C reference points, the time offset of the reference point relative to the first position in the third indication information may be at least one time offset of the reference point relative to the first position in the first indication information, or the reference point period in the third indication information may be at least one reference point period in the first indication information, or the indication identifier of the time domain resource in which the reference point is located in the third indication information is at least one indication identifier of the time domain resource in which the reference point is located in the first indication information, or the reference point identifier in the third indication information may be at least one reference point identifier in the first indication information. If the third indication information may be a further indication based on the D reference points, the time offset of the reference point relative to the first position in the third indication information may be at least one time offset of the reference point relative to the first position in the second indication information, or the reference point period in the third indication information may be at least one reference point period in the second indication information, or the indication identifier of the time domain resource in which the reference point is located in the third indication information is at least one indication identifier of the time domain resource in which the reference point is located in the second indication information, or the reference point identifier in the third indication information may be at least one reference point identifier in the second indication information.

In addition, the first indication information, the second indication information, and the third indication information correspond to included information content, and there may be one or more pieces of information of a same type. For example, multiple time offsets, multiple reference point identifiers, and the like are included. The first control signaling indicates a cell by using a first bitmap, and each bit in the first bitmap corresponds to one candidate cell or a group of candidate cells; and/or the first control signaling indicates a BWP cell by using a second bitmap, and each bit in the second bitmap corresponds to one candidate BWP or a group of candidate BWPs. The second control signaling indicates a cell by using a third bitmap, and each bit in the third bitmap corresponds to one candidate cell or a group of candidate cells; and/or the second control signaling indicates a BWP cell by using a fourth bitmap, and each bit in the fourth bitmap corresponds to one candidate BWP or a group of candidate BWPs.

In some embodiments, the first control signaling is indicated by using a reference point bitmap. In some embodiments, there is a correspondence between at least some bits in a reference point bitmap with a length L and at least some reference points in the C reference points. In some embodiments, a value of a bit corresponding to the D reference points in the reference point bitmap indicates a first value or a second value, the first value indicates that a reference point corresponding to the bit is indicated by the second control signaling (or is used to determine the target resource), and the second value is used to indicate that a corresponding reference point is activated. In some embodiments, L=C.

In some embodiments, the first control signaling is indicated by using a reference point number, that is, indication information in the first control signaling includes a reference point number. In some embodiments, the reference point number is a position (or sequence) of a reference point indicated by the first control signaling in the C reference points, or the reference point number is a position (or sequence) of the reference point in a maximum quantity of reference points. In some embodiments, this or these indicated reference point numbers correspond to D reference points in C reference points configured by the higher layer signaling and/or defined in a protocol. C is a multiple of 8, for example, C≤64 and/or C=8*N, and N is a positive integer. In some embodiments, D=1, for example, 64 reference points are configured by using RRC, and the first control signaling such as DCI indicates one of the 64 reference points.

In some embodiments, the first control signaling indicates the reference point by using a reference point identifier, that is, indication information in the first control signaling includes the reference point identifier.

The second control signaling is indicated by using a reference point bitmap. In some embodiments, there is a correspondence between at least some bits in a reference point bitmap with a length L' and at least some reference points in the C reference points. In some embodiments, there is a correspondence between at least some bits in a bitmap with a length L' and at least some reference points in the D reference points. In some embodiments, a value of a bit corresponding to the E reference points in the reference point bitmap indicates a first value or a second value, the first value indicates that a reference point corresponding to the bit is indicated by the second control signaling (or is used to determine the target resource), and the second value is used to indicate that a corresponding reference point is activated. In some embodiments, L'=D.

In some embodiments, the second control signaling is indicated by using a reference point number. In some embodiments, the reference point number is a position (or sequence) of a reference point indicated by the second control signaling in the C reference points or the D reference points, or the reference point number is a position (or sequence) of a reference point in a maximum quantity of reference points, or the reference point number is a position (or sequence) of a reference point in a reference point bitmap with L bits.

In some embodiments, the second control signaling indicates the reference point by using a reference point identifier, that is, indication information in the second control signaling includes a reference point identifier.

In some embodiments, D=1, these cells and/or BWPs indicated by the first control signaling correspond to a same reference point.

In some embodiments, E=1, these cells and/or BWPs indicated by the second control signaling correspond to a same reference point.

It should be further noted that, in this embodiment, the identifier may be configured by using signaling (such as RRC), and is in a one-to-one correspondence with the target object (such as a reference point, a cell, or a BWP). The number is obtained after a group of target objects are sorted based on a preset condition (such as a position or a sequence).

In this embodiment, for the reference point bitmap, for example, values of the at least some bits include at least one of the following:
 a first value, used to indicate that a corresponding reference point is used;
 a second value, used to indicate that a corresponding reference point is activated; and
 a third value, used to indicate that a corresponding reference point is released or not used.

For example, in the reference point bitmap with a length L, a value of a bit corresponding to a first reference point set may be set to the first value, to indicate that a corresponding reference point is used; or may be set to the second value, to indicate that a corresponding reference point is activated; or may be set to the third value, to indicate that a corresponding reference point is released or not used. In some embodiments, L is equal to a quantity of reference points in the first reference point set. For example, the length L of the reference point bitmap in the second indication information of the first control signaling is C. The reference point may be used to determine the target resource.

In addition, for the reference point bitmap, in some embodiments, all bits in the reference point bitmap are fourth values, to indicate one of the following content:
 a reference point indicated by using indication information in a different type from the current indication information;
 a user-defined reference point;
 no transmission is required;
 no feedback is required;
 there is no data resource;
 there is no feedback resource; and
 there is no target resource.

In a case that all bits in the reference point bitmap are fourth values, if the fourth value indicates that a reference point indicated by indication information with a different type current indication information is to be used, reference points indicated by other indication information different from the current indication information type are used based on the indication information type. The indication information type is a source type of the indication information, such as a MAC CE, RRC, DCI, or other higher layer signaling. For example, when the current indication information type is a MAC CE, the reference point is not subsequently indicated by using the MAC CE, but is indicated by using RRC, DCI, or other higher layer signaling.

If the fourth value indicates that no transmission is required or there is no transmission resource, in a case that the target resource is a data resource (for example, a PUSCH or a PDSCH), no data resource needs to be transmitted or there is no data resource.

If the fourth value indicates that feedback is not required or there is no feedback resource, in a case that the target resource is a feedback resource (such as a PUCCH or a PUSCH) used to feed back information, feedback is not required or there is no feedback resource. For another example, when the target resource is a data resource (a PUSCH or a PDSCH), the fourth value means that feedback is not required or there is no feedback resource.

Certainly, in this embodiment, there may be one or more target resources. In a case that there are multiple target resources, no transmission or no feedback indicated by the fourth value is at least one of the multiple target resources, or at least one target resource does not exist. In some embodiments, transmission of all target resources is cancelled or all target resources do not exist. For example, one DCI schedules two PDSCHs, and a field of a reference point indicated by the DCI is indication information, and all bits in a reference point bitmap of the indication information are the fourth value. In this case, neither PDSCH is transmitted, or neither PDSCH needs to be fed back by a user.

In some embodiments, the feedback information in this embodiment of the present disclosure may be at least one of HARQ feedback information, a CSI report, an RS measurement result (for example, at least one of Reference Signal Received Power (RSRP), Reference Signal Received Quality (RSRQ), and a Received Signal Strength Indication (RSSI)), a requested CSI-RS, a requested SRS, or the like.

For example, in this embodiment, the indication information includes at least one of the following information:
first information, used to indicate that a corresponding reference point is used;
second information, used to indicate that a corresponding reference point is activated; and
third information, used to indicate that a corresponding reference point is released or not used.

In this way, the indication information may be set to include the first information, to indicate that a corresponding reference point is used; or may be set to include the second information, to indicate that a corresponding reference point is activated; or may be set to include the third information, to indicate that a corresponding reference point is released or not used. The reference point may be used determine the target resource.

In some embodiments, the indication information includes fourth information, to indicate one of the following content:
a reference point indicated by using indication information in a different type from the current indication information;
a user-defined reference point;
no transmission is required;
no feedback is required;
there is no data resource;
there is no feedback resource; and
there is no target resource.

In a case that the indication information includes the fourth information, if the fourth information indicates that a reference point indicated by indication information with a different type from current indication information is to be used, a reference point indicated by other indication information different from the current indication information type is used based on the indication information type. For example, when the current indication information type is a MAC CE, the reference point is not subsequently indicated by using the MAC CE, but is indicated by using RRC, DCI, or other higher layer signaling.

If the fourth information indicates that no transmission is required or there is no transmission resource, in a case that the target resource is a data resource (for example, a PUSCH or a PDSCH), no data resource needs to be transmitted or there is no data resource.

If the fourth information indicates that feedback is not required or there is no feedback resource, in a case that the target resource is a feedback resource (such as a PUCCH or a PUSCH) used to feed back information, feedback is not required or there is no feedback resource. For another example, when the target resource is a data resource (a PUSCH or a PDSCH), the fourth information means that feedback is not required or there is no feedback resource.

Certainly, in this embodiment, there may be one or more target resources. In a case that there are multiple target resources, no transmission or no feedback indicated by the fourth information is at least one of the multiple target resources, or at least one target resource does not exist. In some embodiments, all target resources are cancelled or all target resources do not exist. For example, one DCI schedules two PDSCHs, and a field of a reference point indicated by the DCI is indication information, and the indication information includes the fourth information. In this case, neither PDSCH is transmitted, or neither PDSCH needs to be fed back by a user.

In some embodiments, the feedback information in this embodiment of the present disclosure may be at least one of HARQ feedback information, a CSI report, an RS measurement result (for example, at least one of RSRP, RSRQ, or RSSI), a requested CSI-RS, a requested SRS, and the like.

It may be learned from the foregoing content that, because there may be one or more reference points indicated by the indication information, to determine the target resource, in some embodiments, step 102 includes:
determining a target reference point according to the indication information.

In some embodiments, the determining a target reference point according to the indication information includes:
if the indication information indicates only one reference point, a reference point indicated by the indication information is the target reference point.

For indication information indicating multiple reference points, in some embodiments, the determining a target reference point according to the indication information includes:
if the indication information indicates multiple reference points, determining the target reference point based on the multiple reference points, where the target reference point includes at least one of the following:
a reference point at a position at which the indication information is located;
a reference point at a position at which the downlink control information is located;
a reference point at a position at which a second channel is located;
a reference point at a position at which a data channel on a target cell or a target BWP is located;
a reference point that is the farthest from the data channel on the target cell or the target BWP;
a reference point that is the closest to the data channel on the target cell or the target BWP;
a reference point at a position at which downlink control information on the target cell or the target BWP is located;
a reference point that is the farthest from the downlink control information on the target cell or the target BWP;
a reference point that is the closest to the downlink control information on the target cell or the target BWP;
a reference point in a preset reference point type;
a reference point that is the farthest from the downlink control information;
a reference point that is the farthest from the second channel;
a reference point that is the closest to the downlink control information;
a reference point that is the closest to the second channel;
a reference point with which an interval between a feedback resource and a data resource is greater than a processing delay; and
a reference point that meets a first HARQ number.

In this way, in a case that the indication information indicates multiple reference points, the foregoing reference point is selected from the multiple reference points as the target reference point.

The target reference point may be a reference point in the multiple reference points that is at a position at which the indication information is located. The indication information may include DCI, and certainly may not include DCI.

If the target reference point is a reference point at a position at which DCI is located in the multiple reference points, in some embodiments, the DCI may be joint DCI, or may be single DCI. Certainly, based on the position of the DCI, the target reference point may, in some embodiments, be a reference point in the multiple reference points that is the farthest from downlink control information or that is the closest to the downlink control information.

If the target reference point is a reference point at a position of the second channel in the multiple reference points, the second channel may be a PUCCH, a PUSCH, or a PDSCH, for example, if the target resource is a PDSCH, the second channel may be a PUCCH. In some embodiments, the second channel includes at least one of the following:
  a channel that starts or ends first in scheduled channels;
  a channel that starts or ends last in scheduled channels;
  a channel with a preset identifier in scheduled channels;
  a channel with a largest SCS in scheduled channels;
  a channel with a smallest SCS in scheduled channels; and
  a channel whose SCS is a third preset SCS in scheduled channels.

A PDSCH is used as an example. The second channel includes at least one of the following: a PDSCH that starts or ends first in scheduled PDSCHs; a PDSCH that starts or ends last in scheduled PDSCHs; a PDSCH with a preset identifier in scheduled PDSCHs; a PDSCH with a largest SCS in scheduled PDSCHs; a PDSCH with a smallest SCS in scheduled PDSCHs; and a PDSCH whose SCS is a third preset SCS in scheduled PDSCHs.

Certainly, based on the position of the second channel, the target reference point is a reference point in the multiple reference points that is the farthest from the second channel or a reference point that is the closest to the second channel.

In some embodiments, the target cell includes at least one of the following:
  a cell configured with common search space;
  a primary serving cell;
  a cell configured with a synchronization signal;
  a cell configured with a target reference signal; and
  a cell with a second preset cell identity.

Herein, the target reference signal includes at least one of a CSI-RS, an SRS, a PT-RS, a T-RS, and a PRS. The second preset cell identity may be a highest or lowest cell identity, or may be another cell identity.

The target reference point may be a reference point at a position of a data channel on a target cell or a target BWP in the multiple reference points. Certainly, based on the position of the data channel on the target cell or the target BWP, the target reference point may, in some embodiments, be a reference point in the multiple reference points that is the farthest from the data channel on the target cell or on the target BWP, or a reference point that is the closest to the data channel on the target cell or on the target BWP.

In addition, the target reference point may be a reference point at a position of DCI on a target cell or a target BWP in the multiple reference points. Certainly, based on the position of the DCI on the target cell or the target BWP, the target reference point may, in some embodiments, be a reference point in the multiple reference points that is the farthest from the DCI on the target cell or on the target BWP, or a reference point that is the closest to the DCI on the target cell or on the target BWP.

In some embodiments, the target BWP includes at least one of the following:
  a BWP configured with common search space;
  a BWP of a primary serving cell;
  a BWP configured with a synchronization signal;
  a BWP configured with a target reference signal; and
  a BWP with a second preset BWP identifier.

Herein, the target reference signal includes at least one of a CSI-RS, an SRS, a PT-RS, a T-RS, and a PRS. The second preset BWP identifier may be a highest or lowest BWP identifier, or may be another BWP identifier.

In this embodiment, based on the preset reference point type, the target reference point may be a reference point that has a preset reference point type in the multiple reference points. For example, if the preset reference point type is a periodic reference point, the target reference point may be a periodic reference point in the multiple reference points.

In this embodiment, to ensure sufficient processing time, the target reference point may be a reference point whose interval between a corresponding feedback resource and a data resource is greater than a processing delay. For example, in two reference points, a feedback resource determined for a corresponding reference point 1 is slot x1, a feedback resource determined based on a reference point 2 is slot x2, and a time interval between x1 and a scheduled data resource is n1, and a time interval between x2 and the scheduled data resource is n2, where n1 is less than a processing delay requirement N1, and n2 is greater than the processing delay requirement N1. In this case, the reference point 2 is used as the target reference point. Certainly, in some embodiments, if intervals between feedback resources corresponding to the multiple reference points and the data resource are all greater than the processing delay requirement N1, a reference point with a largest interval or a smallest interval is selected as the target reference point. For example, both n1 and n2 are greater than a processing delay, and n1 is greater than n2, and the reference point 1 with a largest interval may be used as the target reference point, or the reference point 2 with a minimum interval is used as the target, to reduce a delay.

Certainly, the target reference point may, in some embodiments, be a reference point that meets a first HARQ number in the multiple reference points. In some embodiments, the first HARQ number includes at least one of the following:
  a HARQ number corresponding to transmission;
  a HARQ number corresponding to the target resource;
  a HARQ number indicated or configured by the indication information; and
  a HARQ number indicated or configured by the downlink control information.

In this way, in the multiple reference points, indication may be performed based on a correspondence between the reference point and the HARQ number. For example, a reference point position divided by a period P is equal to a HARQ process number H corresponding to the target resource, and the target resource determined by the reference point may be used to transmit information of the corresponding HARQ process number H. In some embodiments, a result of (Reference point/P) is rounded up or down to obtain H. In this case, a feedback resource determined by the reference point may be used to transmit feedback information of the corresponding HARQ process number H. In some embodiments, a reference point is specified based on a HARQ number of transmission that needs to be fed back information. For example, if the UE needs to feed back HARQ-ACK information of transmission corresponding to HARQ number=1, a reference point corresponding to HARQ number=1 is selected to determine the feedback resource.

In this embodiment, after the target reference point is determined, for example, step 102 further includes:

obtaining the target resource based on the target reference point and a time interval K'.

Herein, the time interval may be indicated by DCI or configured by RRC. The target resource may be the target reference point+the time interval. For example, if the target reference point is located in slot2, the time interval K'=2 slots, the target resource is located in slot4.

In addition, for example, in this embodiment, after step 102, the method further includes:

transmitting the target resource.

Certainly, the target resource may be a data resource, and data is transmitted by using the target resource. The target resource may, in some embodiments, be a feedback resource, and the feedback information is transmitted by using the target resource. In some embodiments, for transmission of the feedback information, there is a correspondence between a target reference point corresponding to the target resource and a hybrid automatic repeat request process number corresponding to the feedback information.

For example, in this embodiment, if one reference point is configured, pre-defined, or indicated, feedback information of multiple scheduled cells may be fed back on a same time domain resource or a same feedback resource. If the user determines one reference point, the feedback information of the multiple scheduled cells is fed back on a same time domain resource or a same feedback resource.

The following describes application of the method in this embodiment of the present disclosure with reference to a specific scenario.

Figure 2:
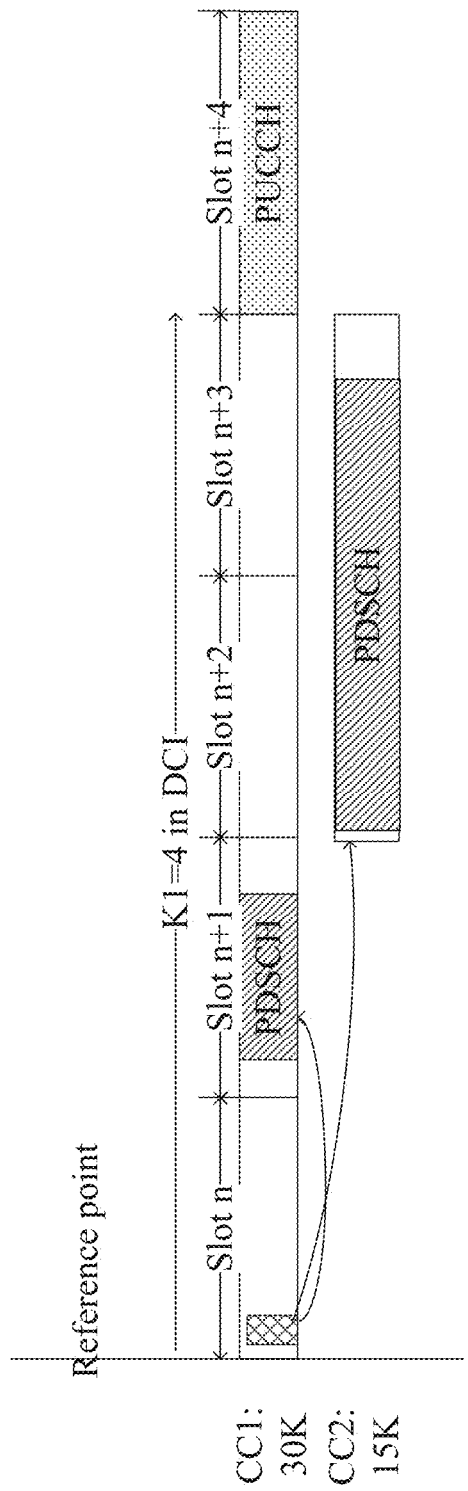
FIG. 2 is a schematic diagram of target resource determining according to an embodiment of the present disclosure.

Scenario 1: It is specified in a protocol that a reference point is a time domain resource in which joint DCI is located. As shown in FIG. 2, the joint DCI schedules two CCs, which are divided into 30 kHz and 15 kHz. The PUCCH is located on a CC1 and the PUCCH SCS is 30 kHz. If joint DCI on a slot n indicates that K1=4, and HARQ-ACKs corresponding to two scheduled PDSCHs on the two CCs are fed back in a slot n+4.

Scenario 2: The first position is a time domain resource in which joint DCI is located, higher layer signaling configures a time offset of the reference point relative to the first position, and time offset=0. As shown in FIG. 2, the joint DCI schedules two CCs, which are divided into 30 kHz and 15 kHz. The PUCCH is located on a CC1 and the PUCCH SCS is 30 kHz. If joint DCI on a slot n indicates that K1=4, and Hybrid Automatic Repeat reQuest ACKnowledgement (HARQ-ACK) corresponding to two scheduled PDSCHs on the two CCs are fed back in a slot n+4.

Scenario 3: The first position is a time domain resource in which joint DCI is located. As shown in FIG. 2, the joint DCI schedules two CCs, which are divided into 30 kHz and 15 kHz. The PUCCH is located on a CC1 and the PUCCH SCS is 30 kHz. If joint DCI on a slot n indicates that K1=4, and indicates a time offset of the reference point relative to the first position, and time offset=0, and HARQ-ACKs corresponding to two scheduled PDSCHs on the two CCs are fed back in a slot n+4.

Scenario 4: A reference point list is configured through RRC, where the reference point list includes indication identifiers of time domain resources of C reference points, and C=8*N, as shown in FIG. 3. The first control signaling includes a reference point bitmap of a length L, C bits in L bits and indication identifiers of time domain resources of the C reference points are in a one-to-one correspondence, and values of D bits in the C bits indicate that corresponding reference points are used. Certainly, values of D bits in the C bits may also indicate that corresponding reference points are indicated. If L=C, values of D bits in the L bits indicate that the reference point is used.

For example, when bit=1, it indicates that the reference point is used or indicated, and if D=8, eight bits=1, and reference points corresponding to the eight bits are used or indicated. In some embodiments, for example, when bit=0, it indicates that the reference point is used or indicated, and if D=8, eight bits=0, and reference points corresponding to the eight bits are used or indicated.

Figure 4:
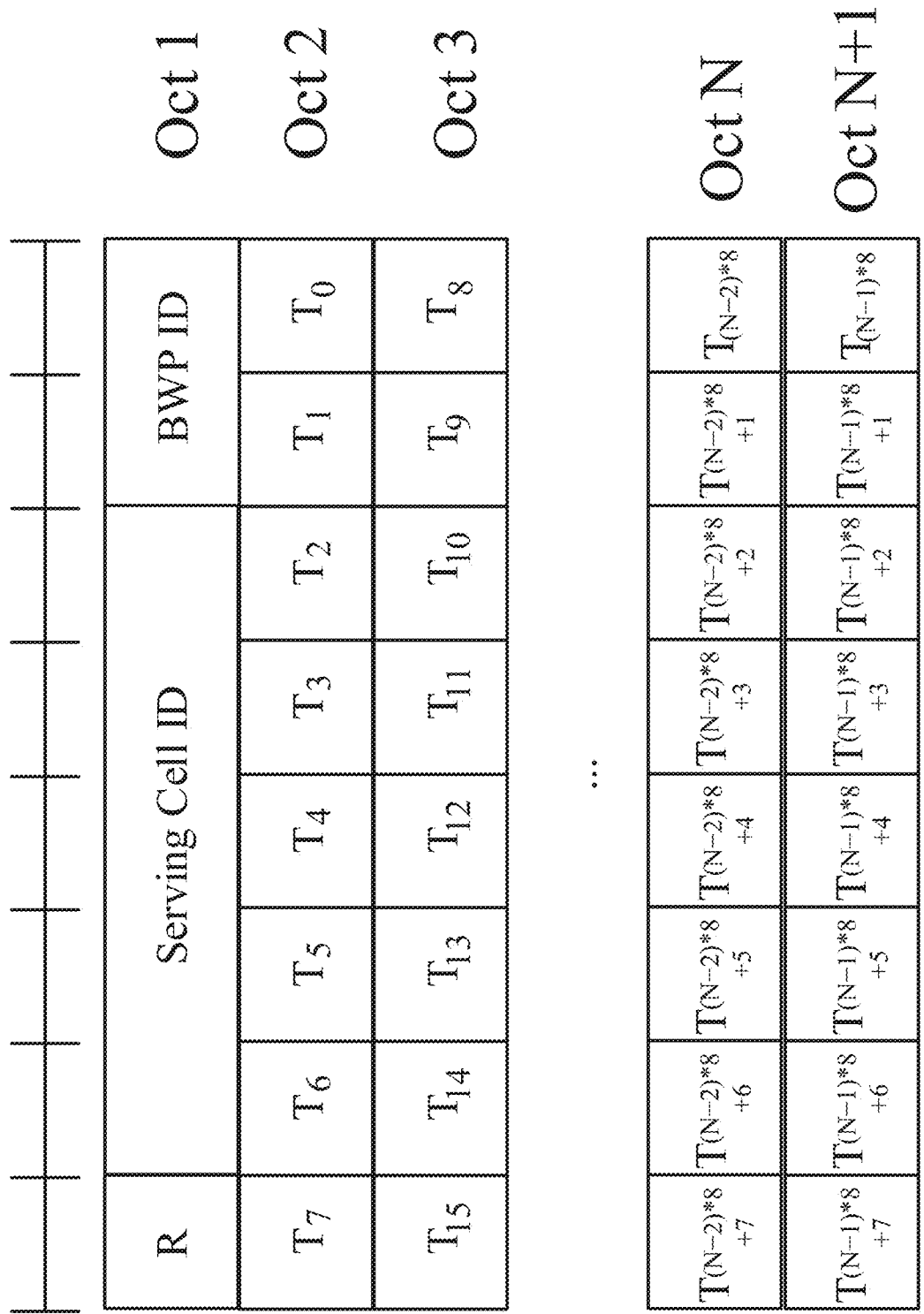
FIG. 4 is a first schematic structural diagram of first control signaling according to an embodiment of the present disclosure.

Further, in some embodiments, the first control signaling further carries a corresponding cell identity and a corresponding BWP identifier, as shown in FIG. 4.

In some embodiments, if D=1, the UE uses the reference point to determine the feedback resource.

In some embodiments, the UE obtains the second control signaling, where the second control signaling indicates a number of a reference point in the D reference points indicated by the first control signaling (the number may be a number of the reference point in the C reference points, or may be a relative number of the reference point in the D reference points), and the reference point is used to determine the feedback resource. In some embodiments, the first control signaling is a MAC CE, and the second control signaling is DCI.

For example, reference points 1 to 64 are configured by a higher layer, and the first control signaling indicates reference points 1, 2, 4, 5, 7, 8, 16, and 20. If the second control signaling may indicate the number 4, one implementation of the second control signaling is: indicating the reference point 4; and another implementation is: indicating the fourth reference point in {reference points 1, 2, 4, 5, 7, 8, 16, 20}, that is, the reference point 5. Both implementations may work.

For example, the second control signaling indicates the reference point 5, and the reference point 5 is a slot n. It is assumed that the second control signaling (joint DCI) schedules two CCs, which are divided into 30 kHz and 15 kHz, as shown in FIG. 2. The PUCCH is located on a CC1 and the PUCCH SCS is 30 kHz. If the joint DCI indicates that K1=4, and HARQ-ACKs corresponding to two scheduled PDSCHs on the two CCs are fed back in a slot n+4.

Scenario 5: The first control signaling is a MAC CE, and indicates a reference point.

Figure 5:
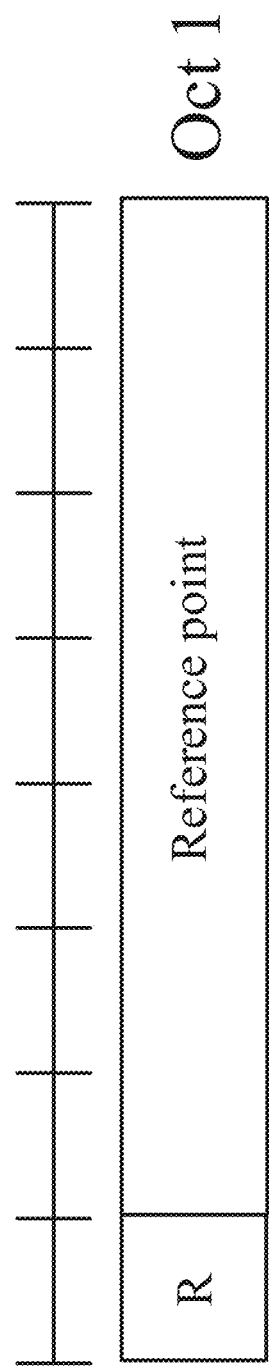
FIG. 5 is a second schematic structural diagram of first control signaling according to an embodiment of the present disclosure.

If the first control signaling indicates a reference point, the first control signaling may be designed as shown in FIG. 5, where R is a reserved field, and may occupy 0 bits, and remaining fields are indication information fields and carry indication information of one reference point. In this way, reference points 1 to 64 are configured through higher layer signaling, and indication information of the first control signaling indicates a reference point 5.

Figure 6:
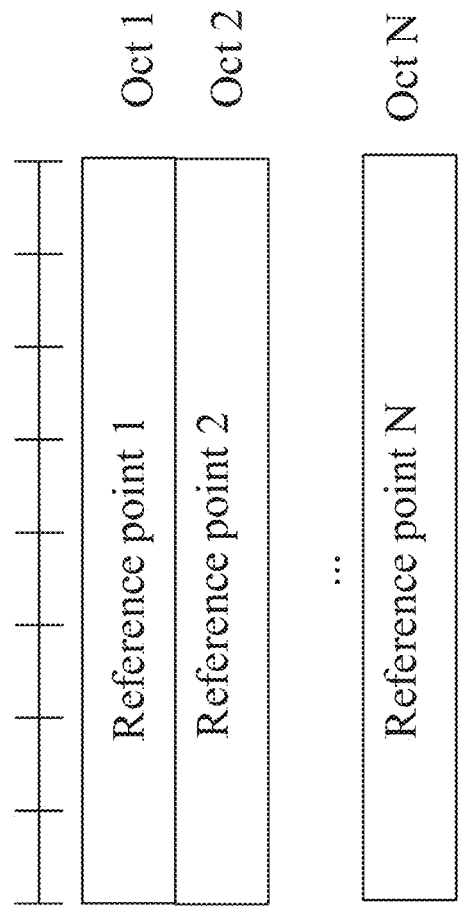
FIG. 6 is a third schematic structural diagram of first control signaling according to an embodiment of the present disclosure.

If the first control signaling indicates multiple reference points, and it is assumed that indication information of each reference point occupies 8 bits, the first control signaling may be designed as shown in FIG. 6. In this way, reference points 1 to 64 are configured through higher layer signaling, and indication information of the first control signaling indicates reference points 6, 7, and 8.

Further, the first control signaling may further carry a BWP identifier and/or a cell identity.

Scenario 6: The first control signaling is joint DCI, and indicates a number of a reference point, such as a number 5, and reference points 1 to 64 are configured by a higher layer. It is assumed that a reference point 5 is a slot n, and the first control signaling (joint DCI) schedules two CCs, which are divided into 30 kHz and 15 kHz. The PUCCH is located on a CC1 and the PUCCH SCS is 30 kHz. If the joint DCI indicates that K1=4, and HARQ-ACKs corresponding to two scheduled PDSCHs on the two CCs are fed back in a slot n+4.

In conclusion, in the method in this embodiment of the present disclosure, the indication information is obtained first, because the indication information is for the target resource and indicates information about one or more reference points of the target resource, and then the target resource used for transmission can be determined by using the indication information, thereby avoiding a case in which a transmission resource cannot be determined, and ensuring implementation of transmission.

Figure 7:
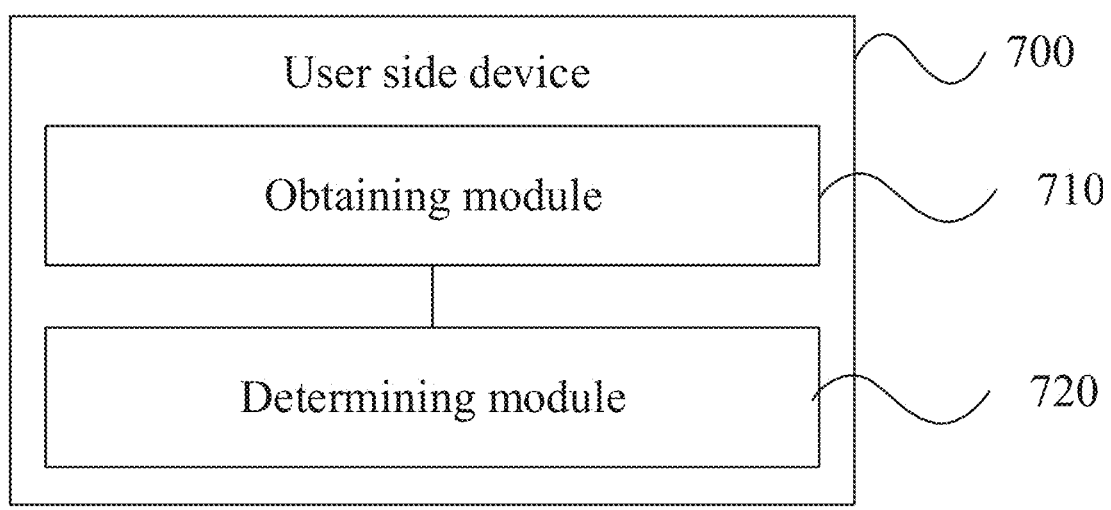
FIG. 7 is a schematic structural diagram of a user side device according to an embodiment of the present disclosure.

FIG. 7 is a block diagram of a user side device according to an embodiment of the present disclosure. A user side device 700 shown in FIG. 7 includes an obtaining module 710 and a determining module 720.

The obtaining module 710 is configured to obtain indication information of one or more reference points of a target resource.

The determining module 720 is configured to determine the target resource according to the indication information.

In some embodiments, the information includes at least one of the following:
 a position of a first channel;
 a type of the reference point;
 a time offset of the reference point relative to a first position;
 a period;
 an indication identifier of a frequency domain resource in which the reference point is located;
 an indication identifier of a time domain resource in which the reference point is located;
 a reference point identifier;
 cell information;
 bandwidth part BWP information; and
 HARQ process information of the reference point.

In some embodiments, the first channel includes at least one of the following:
 a channel on a cell corresponding to a first preset cell identity in scheduled cells;
 a channel on a BWP corresponding to a first preset BWP identifier in scheduled BWPs;
 a channel on a BWP corresponding to a first preset subcarrier spacing SCS in the scheduled BWPs; and
 a channel on which a resource corresponding to a second preset SCS in scheduled resources is located.

In some embodiments, the first position includes at least one of the following:
 a position of a time domain resource in which the indication information is located;
 a position of a time domain resource in which downlink control information is located;
 a position of a target slot of a preset system frame number SFN;
 a boundary of a target window;
 a start position of a period of search space in which the downlink control information is located;
 an end position of the period of the search space in which the downlink control information is located;
 a time domain position of a reference object; and
 a time domain position of a quasi-co-location reference.

In some embodiments, the cell information includes a cell identity and/or a cell bitmap.

In some embodiments, the cell information includes information about at least one cell or cell group corresponding to the reference point.

In some embodiments, the BWP information includes a BWP identifier and/or a BWP bitmap.

In some embodiments, the BWP information includes information about at least one BWP or BWP group corresponding to the reference point.

In some embodiments, the indication information includes a reference point bitmap and/or a reference point number; where
 at least some bits in the reference point bitmap correspond to at least some reference points in a first reference point set; and/or
 the reference point number is a number of a reference point in the first reference point set, or the reference point number is a number of a reference point in a preset quantity of reference points; and
 the first reference point set is a set of reference points determined by using at least one of higher layer signaling, pre-defined signaling, and control signaling.

In some embodiments, values of the at least some bits include at least one of the following:
 a first value, used to indicate that a corresponding reference point is used;
 a second value, used to indicate that a corresponding reference point is activated; and
 a third value, used to indicate that a corresponding reference point is released or not used.

In some embodiments, all bits in the reference point bitmap are fourth values, to indicate one of the following content:
 a reference point indicated by using indication information in a different type from the current indication information;
 a user-defined reference point;
 no transmission is required;
 no feedback is required;
 there is no data resource;
 there is no feedback resource; and
 there is no target resource.

In some embodiments, the determining module includes:
 a first processing submodule, configured to determine a target reference point according to the indication information.

In some embodiments, the determining a target reference point according to the indication information includes:
 if the indication information indicates only one reference point, a reference point indicated by the indication information is the target reference point.

In some embodiments, the determining a target reference point according to the indication information includes:
 if the indication information indicates multiple reference points, determining the target reference point based on the multiple reference points, where the target reference point includes at least one of the following:
 a reference point at a position at which the indication information is located;
 a reference point at a position at which the downlink control information is located;
 a reference point at a position at which a second channel is located;
 a reference point at a position at which a data channel on a target cell or a target BWP is located;

a reference point that is the farthest from the data channel on the target cell or the target BWP;

a reference point that is the closest to the data channel on the target cell or the target BWP;

a reference point at a position at which downlink control information on the target cell or the target BWP is located;

a reference point that is the farthest from the downlink control information on the target cell or the target BWP;

a reference point that is the closest to the downlink control information on the target cell or the target BWP;

a reference point in a preset reference point type;

a reference point that is the farthest from the downlink control information;

a reference point that is the farthest from the second channel;

a reference point that is the closest to the downlink control information;

a reference point that is the closest to the second channel;

a reference point with which an interval between a feedback resource and a data resource is greater than a processing delay; and a reference point that meets a first HARQ number.

In some embodiments, the first HARQ number includes at least one of the following:

a HARQ number corresponding to transmission;

a HARQ number corresponding to the target resource;

a HARQ number indicated or configured by the indication information; and a HARQ number indicated or configured by the downlink control information.

In some embodiments, the second channel includes at least one of the following:

a channel that starts or ends first in scheduled channels;

a channel that starts or ends last in scheduled channels;

a channel with a preset identifier in scheduled channels;

a channel with a largest SCS in scheduled channels;

a channel with a smallest SCS in scheduled channels; and a channel whose SCS is a third preset SCS in scheduled channels.

In some embodiments, the target cell includes at least one of the following:

a cell configured with common search space;

a primary serving cell;

a cell configured with a synchronization signal;

a cell configured with a target reference signal; and a cell with a second preset cell identity.

In some embodiments, the target BWP includes at least one of the following:

a BWP configured with common search space;

a BWP of a primary serving cell;

a BWP configured with a synchronization signal;

a BWP configured with a target reference signal; and a BWP with a second preset BWP identifier.

In some embodiments, the determining module further includes:

a second processing submodule, configured to obtain the target resource based on the target reference point and a time interval.

In some embodiments, the user side device further includes:

a transmission module, configured to transmit the target resource.

In some embodiments, the information includes at least one of the following information:

first information, used to indicate that a corresponding reference point is used;

second information, used to indicate that a corresponding reference point is activated; and third information, used to indicate that a corresponding reference point is released or not used.

In some embodiments, the indication information includes fourth information, to indicate one of the following content:

a reference point indicated by using indication information in a different type from the current indication information;

a user-defined reference point;

no transmission is required;

no feedback is required;

there is no data resource;

there is no feedback resource; and there is no target resource.

In some embodiments, the obtaining module obtains indication information of one or more reference points of the target resource in at least one of the following manners:

through higher layer signaling;

being pre-defined; or through control signaling.

The user side device 700 can implement processes implemented by the user side device in the foregoing method embodiments in FIG. 1 to FIG. 6. To avoid repetition, details are not described herein again. The user side device in this embodiment of the present disclosure first obtains the indication information, because the indication information is for the target resource and indicates information about one or more reference points of the target resource, and then the target resource used for transmission can be determined by using the indication information, thereby avoiding a case in which a transmission resource cannot be determined, and ensuring implementation of transmission.

Figure 8:
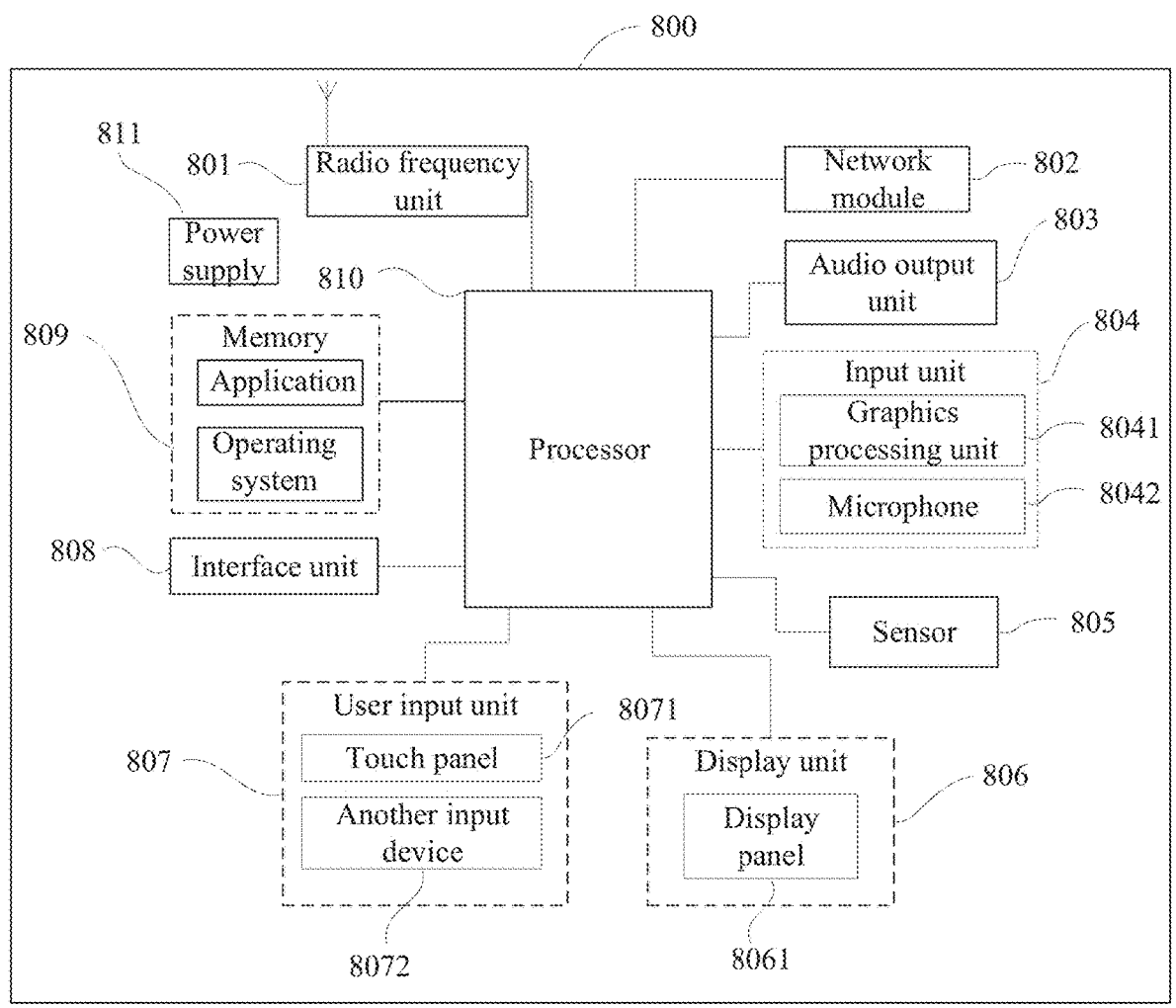
FIG. 8 is a schematic structural diagram of a user side device according to another embodiment of the present disclosure.

FIG. 8 is a schematic diagram of a hardware structure of a user side device for implementing the embodiments of the present disclosure. The user side device 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that a structure of the user side device shown in FIG. 8 does not constitute a limitation on the user side device, and the user side device may include more or fewer components than those shown in the figure, or combine some components, or have different component arrangements. In this embodiment of the present disclosure, the user side device includes but is not limited to a mobile phone, a tablet computer, a laptop computer, a palmtop computer, an in-vehicle terminal, a wearable device, a pedometer, and the like.

The processor 810 is configured to: obtain indication information of one or more reference points of a target resource; and determine the target resource according to the indication information.

It can be learned that, the user side device first obtains the indication information, because the indication information is for the target resource and indicates information about one or more reference points of the target resource, and then the target resource used for transmission can be determined by using the indication information, thereby avoiding a case in which a transmission resource cannot be determined, and ensuring implementation of transmission.

It should be understood that, in this embodiment of the present disclosure, the radio frequency unit 801 may be configured to receive and send information or receive and send a signal in a call process. In some embodiments, after downlink data from a base station is received, the processor 810 processes the downlink data. In addition, uplink data is sent to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and another device by using a wireless communication system.

The user side device provides wireless broadband Internet access for the user by using the network module 802, for example, helping the user send and receive an email, browse a web page, and access streaming media.

The audio output unit 803 may convert audio data received by the radio frequency unit 801 or the network module 802 or stored in the memory 809 into an audio signal and output as sound. In addition, the audio output unit 803 may further provide audio output (for example, call signal receiving sound or message receiving sound) related to a specific function performed by the user side device 800. The audio output unit 803 includes a speaker, a buzzer, a telephone receiver, and the like.

The input unit 804 is configured to receive an audio or video signal. The input unit 804 may include a Graphics Processing Unit (GPU) 8041 and a microphone 8042. The graphics processing unit 8041 processes image data of a static picture or a video obtained by an image capture apparatus (such as a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive sound and can process such sound into audio data. The processed audio data may be output by being converted into a format that may be sent to a mobile communications base station by using the radio frequency unit 801 in a telephone call mode.

The user side device 800 further includes at least one sensor 805, such as an optical sensor, a motion sensor, and another sensor. In some embodiments, the optical sensor includes an ambient light sensor and a proximity sensor. The ambient light sensor may adjust luminance of a display panel 8061 based on brightness of ambient light, and the proximity sensor may disable the display panel 8061 and/or backlight when the user side device 800 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a gesture (for example, horizontal and vertical screen switching, a related game, or magnetometer posture calibration) of the user side device, a function related to vibration recognition (for example, a pedometer or a strike), or the like. The sensor 805 may further include a fingerprint sensor, a pressure sensor, an iris sensor, a molecular sensor, a gyroscope, a barometer, a hygrometer, a thermometer, an infrared sensor, and the like. This is not described herein.

The display unit 806 is configured to display information entered by the user or information provided for the user. The display unit 806 may include a display panel 8061, and the display panel 8061 may be configured in a form of a Liquid Crystal Display (LCD), an Organic Light-Emitting Diode (OLED), or the like.

The user input unit 807 may be configured to receive input digit or character information and generate key signal input related to user setting and function control of the user side device. In some embodiments, the user input unit 807 includes a touch panel 8071 and another input device 8072. The touch panel 8071, also referred to as a touchscreen, may collect a touch operation performed by the user on or near the touch panel 8071 (for example, an operation performed by the user on or near the touch panel 8071 by using any suitable object or accessory such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and can receive and execute a command sent by the processor 810. In addition, the touch panel 8071 may be implemented by using multiple types such as a resistive type, a capacitive type, an infrared ray, and a surface acoustic wave. The user input unit 807 may include another input device 8072 in addition to the touch panel 8071. In some embodiments, the another input device 8072 may include but is not limited to one or more of a physical keyboard, a function key (such as a volume control key or an on/off key), a trackball, a mouse, a joystick, and the like. Details are not described herein.

Further, the touch panel 8071 may cover the display panel 8061. After detecting the touch operation on or near the touch panel 8071, the touch panel 8061 transmits the touch operation to the processor 810 to determine a type of a touch event, and then the processor 810 provides corresponding visual output on the display panel 8061 based on the type of the touch event. In FIG. 8, the touch panel 8071 and the display panel 8061 are used as two independent components to implement input and output functions of the user side device. However, in some embodiments, the touch panel 8071 and the display panel 8061 may be integrated to implement the input and output functions of the user side device. This is not specifically limited herein.

The interface unit 808 is an interface connecting an external apparatus to the user side device 800. For example, the external apparatus may include a wired or wireless headset port, an external power supply (or battery charger) port, a wired or wireless data port, a storage card port, a port configured to connect to an apparatus having an identification module, an audio Input/Output (I/O) port, a video I/O port, a headset port, and the like. The interface unit 808 may be configured to receive input (for example, data information and power) from the external apparatus and transmit the received input to one or more elements in the user side device 800, or may be configured to transmit data between the user side device 800 and the external apparatus.

The memory 809 may be configured to store a software program and various data. The memory 809 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 809 may include a high-speed random access memory, and may further include a non-volatile memory such as at least one magnetic disk storage component, a flash memory component, or another volatile solid-state storage component.

The processor 810 is a control center of the user side device, and is connected to all parts of the entire user side device by using various interfaces and lines, and performs various functions of the terminal device and processes data by running or executing the software program and/or the module that are stored in the memory 809 and invoking the data stored in the memory 809, to implement overall monitoring on the user side device. The processor 810 may include one or more processing units. In some embodiments, the processor 810 may be integrated with an application processor and a modem processor. The application processor mainly processes an operating system, a user interface, an application program, and the like, and the modem processor mainly processes wireless communication. It may be understood that the modem processor may also not be integrated into the processor 810.

The user side device 800 may further include the power supply 811 (such as a battery) that supplies power to each component. In some embodiments, the power supply 811 may be logically connected to the processor 810 by using a power management system, to implement functions such as charging, discharging, and power consumption management by using the power management system.

In addition, the user side device 800 includes some functional modules not shown, and details are not described herein.

For example, an embodiment of the present disclosure further provides a user side terminal, including a processor, a memory, and a computer program that is stored in the memory and that can run on the processor. When the computer program is executed by the processor, the processes of the embodiments of the foregoing resource determining method are implemented, and a same technical effect can be achieved. To avoid repetition, details are not described herein.

An embodiment of the present disclosure further provides a computer-readable storage medium. A computer program is stored in the computer-readable storage medium. When being executed by a processor, the processes of the embodiments of the foregoing resource determining method can be implemented, and a same technical effect can be achieved. To avoid repetition, details are not described herein. The computer-readable storage medium includes Read-Only Memory (ROM), a Random Access Memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . ." does not exclude another same element in a process, method, article, or apparatus that includes the element.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual coupling or direct coupling or communication connection may be through some interfaces, indirect coupling or communication connection of the apparatus or unit, and may be in an electrical, mechanical, or another form.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each unit may exist separately physically, or two or more units may be integrated into one unit.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

A person of ordinary skill in the art may understand that all or some of the processes in the methods in the foregoing embodiments may be implemented by using a computer program to control related hardware. The program may be stored in a computer readable storage medium. When the program is executed, the processes in the foregoing methods embodiments may be performed. The storage medium includes a magnetic disk, a compact disc, a ROM, a RAM, or the like.

It may be understood that the embodiments described in the embodiments of the present disclosure may be implemented by hardware, software, firmware, middleware, microcode, or a combination thereof. For hardware implementation, a module, a unit, a subunit, or the like may be implemented in one or more Application Specific Integrated Circuits (ASIC), a Digital Signal Processing (DSP), a DSP Device (DSPD), a Programmable Logic Device (PLD), a Field-Programmable Gate Array (FPGA), a general purpose processor, a controller, a microcontroller, a microprocessor, another electronic unit configured to perform the functions described in the present disclosure, or a combination thereof.

For software implementations, the techniques described in the embodiments of the present disclosure may be implemented by modules (for example, processes and functions) that perform the functions described in the embodiments of the present disclosure. The software code may be stored in a memory and executed by a processor. The memory may be implemented in or outside the processor.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A resource determining method, comprising:
obtaining indication information of one or more reference points of a target resource; and
determining the target resource according to the indication information,
wherein the indication information comprises a position of a first channel, the first channel comprises a Physical Downlink Shared CHannel (PDSCH), and the first channel comprises a channel on a cell corresponding to a lowest cell identity in one or more scheduled cells; and/or
wherein the indication information is used to determine a target reference point, wherein:
when the indication information indicates only one reference point, the target reference point is determined to be the one reference point indicated by the indication information; or
when the indication information indicates multiple reference points, the target reference point is determined based on the multiple reference points, wherein the target reference point comprises a reference point at a position at which a second channel is located, wherein the second channel comprises a channel that ends last in one or more scheduled channels.

2. The method according to claim 1, wherein for a reference point from the one or more reference points, the indication information further comprises at least one of the following:
a type of the reference point;
a time offset of the reference point relative to a first position;
a period of the reference point;
an indication identifier of a frequency domain resource in which the reference point is located;
an indication identifier of a time domain resource in which the reference point is located;
a reference point identifier;
cell information;
BandWidth Part (BWP) information; or
Hybrid Automatic Repeat reQuest (HARQ) process information of the reference point.

3. The method according to claim 2, wherein the first channel comprises at least one of the following:
a channel on a cell corresponding to a first preset cell identity in the one or more scheduled cells;
a channel on a BWP corresponding to a first preset BWP identifier in scheduled BWPs;
a channel on a BWP corresponding to a first preset SubCarrier Spacing (SCS) in the scheduled BWPs; or
a channel on which a resource corresponding to a second preset SCS in scheduled resources is located.

4. The method according to claim 2, wherein the first position comprises at least one of the following:
a position of a time domain resource in which the indication information is located;
a position of a time domain resource in which downlink control information is located;
a position of a target slot of a preset System Frame Number (SFN);
a boundary of a target window;
a start position of a period of search space in which the downlink control information is located;
an end position of the period of the search space in which the downlink control information is located;
a time domain position of a reference object; or
a time domain position of a quasi-co-location reference.

5. The method according to claim 2, wherein the cell information comprises a cell identity or a cell bitmap.

6. The method according to claim 2, wherein the cell information comprises information about at least one cell or cell group corresponding to the reference point.

7. The method according to claim 2, wherein the BWP information comprises a BWP identifier or a BWP bitmap.

8. The method according to claim 2, wherein the BWP information comprises information about at least one BWP or BWP group corresponding to the reference point.

9. The method according to claim 1, wherein the indication information comprises a reference point bitmap or a reference point number;
at least some bits in the reference point bitmap correspond to at least some reference points in a first reference point set;
the reference point number is a number of a reference point in the first reference point set, or the reference point number is a number of a reference point in a preset quantity of reference points; and
the first reference point set is a set of reference points determined by using at least one of higher layer signaling, pre-defined signaling, or control signaling.

10. The method according to claim 9, wherein values of the at least some bits comprise at least one of the following:
a first value, used to indicate that a corresponding reference point is used;
a second value, used to indicate that a corresponding reference point is activated; or
a third value, used to indicate that a corresponding reference point is released or not used.

11. The method according to claim 9, wherein all bits in the reference point bitmap are fourth values used to indicate one of the following:
a reference point indicated by using indication information in a different type from the current indication information;
a user-defined reference point;
no transmission is required;
no feedback is required;
there is no data resource;
there is no feedback resource; or
there is no target resource.

12. The method according to claim 1,
wherein the target reference point further comprises at least one of the following:
a reference point at a position at which the indication information is located;
a reference point at a position at which downlink control information is located;
a reference point at a position at which a data channel on a target cell or a target BandWidth Part (BWP) is located;
a reference point that is the farthest from the data channel on the target cell or the target BWP;
a reference point that is the closest to the data channel on the target cell or the target BWP;
a reference point at a position at which downlink control information on the target cell or the target BWP is located;
a reference point that is the farthest from the downlink control information on the target cell or the target BWP;

a reference point that is the closest to the downlink control information on the target cell or the target BWP;

a reference point in a preset reference point type;

a reference point that is the farthest from the downlink control information;

a reference point that is the farthest from the second channel;

a reference point that is the closest to the downlink control information;

a reference point that is the closest to the second channel;

a reference point with which an interval between a feedback resource and a data resource is greater than a processing delay; or a reference point that meets a first Hybrid Automatic Repeat reQuest (HARQ) number.

13. The method according to claim 12, wherein the first HARQ number comprises at least one of the following:

a HARQ number corresponding to transmission;

a HARQ number corresponding to the target resource;

a HARQ number indicated or configured by the indication information; or a HARQ number indicated or configured by the downlink control information.

14. The method according to claim 12, wherein the second channel further comprises at least one of the following:

a channel that starts or ends first in the one or more scheduled channels;

a channel that starts in the one or more scheduled channels;

a channel with a preset identifier in the one or more scheduled channels;

a channel with a largest SubCarrier Spacing (SCS) in the one or more scheduled channels;

a channel with a smallest SCS in the one or more scheduled channels; or a channel whose SCS is a third preset SCS in the one or more scheduled channels.

15. The method according to claim 12, wherein the target cell comprises at least one of the following:

a cell configured with common search space;

a primary serving cell;

a cell configured with a synchronization signal;

a cell configured with a target reference signal; or a cell with a second preset cell identity.

16. The method according to claim 12, wherein the target BWP comprises at least one of the following:

a BWP configured with common search space;

a BWP of a primary serving cell;

a BWP configured with a synchronization signal;

a BWP configured with a target reference signal; or a BWP with a second preset BWP identifier.

17. The method according to claim 1, wherein the indication information comprises at least one of the following information:

first information, used to indicate that a corresponding reference point is used;

second information, used to indicate that a corresponding reference point is activated; and third information, used to indicate that a corresponding reference point is released or not used.

18. The method according to claim 1, wherein the indication information comprises fourth information that is used to indicate at least one of the following content:

a reference point indicated by using indication information in a different type from the current indication information;

a user-defined reference point;

no transmission is required;

no feedback is required;

there is no data resource;

there is no feedback resource; or there is no target resource.

19. A user side device, comprising:

a memory storing computer-readable instructions; and a processor coupled to the memory and configured to execute the computer-readable instructions, wherein the computer-readable instructions, when executed by the processor, cause the processor to perform operations comprising:

obtaining indication information of one or more reference points of a target resource; and determining the target resource according to the indication information, wherein the indication information comprises a position of a first channel, the first channel comprises a Physical Downlink Shared CHannel (PDSCH), and the first channel comprises a channel on a cell corresponding to a lowest cell identity in one or more scheduled cells; and/or wherein the indication information is used to determine a target reference point, wherein:

when the indication information indicates only one reference point, the target reference point is determined to be the one reference point indicated by the indication information; or when the indication information indicates multiple reference points, the target reference point is determined based on the multiple reference points, wherein the target reference point comprises a reference point at a position at which a second channel is located, wherein the second channel comprises a channel that ends last in one or more scheduled channels.

* * * * *